United States Patent
Sasaki et al.

(10) Patent No.: US 8,151,549 B2
(45) Date of Patent: Apr. 10, 2012

(54) HIGH HUMIDITY GAS TURBINE EQUIPMENT

(75) Inventors: Kenji Sasaki, Hitachi (JP); Yoshiki Noguchi, Hitachi (JP); Kenji Sakka, Hitachi (JP); Hirotsugu Fukuhara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 873 days.

(21) Appl. No.: 12/186,003

(22) Filed: Aug. 5, 2008

(65) Prior Publication Data
US 2009/0038287 A1 Feb. 12, 2009

(30) Foreign Application Priority Data

Aug. 7, 2007 (JP) .................... 2007-205021

(51) Int. Cl.
*F02C 7/00* (2006.01)
*F02C 7/10* (2006.01)
*F02C 1/00* (2006.01)

(52) U.S. Cl. .............. 60/39.511; 60/39.53; 60/728

(58) Field of Classification Search .......... 60/39.53, 60/39.511, 39.5, 39.182, 39.59, 728, 39.3
See application file for complete search history.

(56) References Cited

U.S. PATENT DOCUMENTS

| | | | | |
|---|---|---|---|---|
| 4,448,018 A * | 5/1984 | Sayama et al. ............... 60/775 |
| 4,753,068 A * | 6/1988 | El-Masri .................. 60/39.511 |
| 5,181,376 A * | 1/1993 | Rao .......................... 60/775 |
| 5,623,822 A * | 4/1997 | Schuetzenduebel et al. ................. 60/39.182 |
| 5,727,377 A * | 3/1998 | Fetescu et al. ............. 60/775 |
| 5,778,675 A * | 7/1998 | Nakhamkin ............... 60/652 |
| 6,223,523 B1 * | 5/2001 | Frutschi ..................... 60/775 |
| 6,247,302 B1 * | 6/2001 | Tsukamoto et al. ....... 60/39.511 |
| 6,389,799 B1 * | 5/2002 | Hatamiya et al. .......... 60/39.3 |
| 6,581,368 B2 * | 6/2003 | Utamura ................... 60/39.3 |
| 6,973,772 B2 * | 12/2005 | Hatamiya et al. ......... 60/39.511 |
| 7,082,749 B2 * | 8/2006 | Hatamiya et al. .......... 60/39.53 |
| 7,146,795 B2 * | 12/2006 | Pelini ...................... 60/39.55 |
| 7,204,077 B2 * | 4/2007 | Tanaka et al. ............. 60/39.41 |
| 7,721,552 B2 * | 5/2010 | Hansson et al. ............. 60/775 |

FOREIGN PATENT DOCUMENTS

JP 9-264158 10/1997

* cited by examiner

*Primary Examiner* — William H Rodriguez
*Assistant Examiner* — Gerald Sung
(74) *Attorney, Agent, or Firm* — Mattingly & Malur, PC

(57) ABSTRACT

A high humidity gas turbine equipment includes a turbine; a compressor; a humidifier, which brings the air compressed by the compressor into contact with feed water to humidify the air; a regenerative heat exchanger, which causes the air humidified by the humidifier to be heated by exhaust gas from the turbine; a combustor, which burns the air heated by the regenerative heat exchanger and fuel to generate the combustion gas; a deaerating equipment including a deaerating section, a water storage tank, and a steam generating section, which causes feed water and makeup water in the water storage tank to be heated by exhaust gas from the turbine to evaporate and supplies the steam to the deaerating section; and a feed water supply pipe, through which the feed water and the makeup water in the water storage tank are supplied to the humidifier.

8 Claims, 2 Drawing Sheets

HIGH HUMIDITY GAS TURBINE EQUIPMENT

BACKGROUND OF THE INVENTION

The present invention relates to a high humidity gas turbine equipment, in which a turbine is driven by combustion gas obtained from a humidified air and fuel drive.

High humidity gas turbine equipment uses a humidifier to humidify air compressed by a compressor to feed the humidified air to a combustor to generate combustion gas to drive a turbine. When a compressed air being supplied to a combustor is humidified in this manner, combustion gas are increased in flow rate and in specific heat capacity, so that it is possible to increase a turbine output as compared with the case where a compressed air is not humidified. Also, when an amount of heat required for generating electrical energy, such as generation of moisture content for a humidifier, heating of a compressed air, etc. is recovered from exhaust gas from a turbine, it is possible to achieve a further improvement in power generating efficiency.

By the way, a gas turbine equipment of this kind is provided with a feed water system for circulation and utilization of water used in a humidifier for humidification of a compressed air. Since the water circulating in the system is in contact with a compressed air in the humidifier to contain oxygen, it is required that a high corrosion-resisting material (for example, stainless steel) be used in a location, through which feed water containing oxygen flows. In a technology for an improvement in this matter, feed water is reduced in pressure by a vacuum deaerator to create a saturated state, so that the feed water is decreased in dissolved oxygen concentration (that is, oxygen is degassed) (see JP-A-9-264158, etc.)

By the way, since feed water is generally decreased according to an amount used for humidification of a compressed air in a humidifier of a high humidity gas turbine equipment, it is necessary to appropriately supply makeup water. Accordingly, it is demanded to make use of that makeup water, which does not contain oxygen, from the view point of protecting a feed water system against corrosion. However, the technology described above makes no reference to a mechanism for deaeration of makeup water. Also, it can be pointed out that in a vacuum deaerator as in the technology described above, only reduction in pressure of feed water results in an unfavorable deaerating efficiency because of limitation in gas-liquid contact area.

SUMMARY OF THE INVENTION

It is an object of the invention to provide a high humidity gas turbine equipment capable of simultaneously deaerating feed water and makeup water.

In order to attain the object, the invention provides a high humidity gas turbine equipment comprising: a turbine driven by combustion gas; a compressor, which compresses air; a humidifier, which brings air compressed by the compressor into contact with feed water to humidify the same; a regenerative heat exchanger, which causes the air humidified by the humidifier to be heated by exhaust gas from the turbine; a combustor, which burns the air heated by the regenerative heat exchanger and fuel to generate combustion gas, which drive the turbine; a deaerating equipment including a deaerating section, to which the feed water used in the humidifier for humidification of air and makeup water to the humidifier are supplied and which deaerates the feed water and the makeup water with steam, a water storage tank, in which the feed water deaerated in the deaerating section and the makeup water are stored, and a steam generating section, which causes the feed water and the makeup water in the water storage tank to be heated by exhaust gas from the turbine to evaporate and supplies the steam to the deaerating section; and a feed water supply piping, through which the feed water and the makeup water in the water storage tank are supplied to the humidifier.

According to the invention, it is possible to efficiently and simultaneously deaerate the feed water used for humidification of the compressed air and the makeup water.

Other objects, features and advantages of the invention will become apparent from the following description of the embodiments of the invention taken in conjunction with the accompanying drawings.

DESCRIPTION OF THE PREFERRED EMBODIMENTS

Embodiments of the invention will be described with reference to the drawings.

Figure 1:
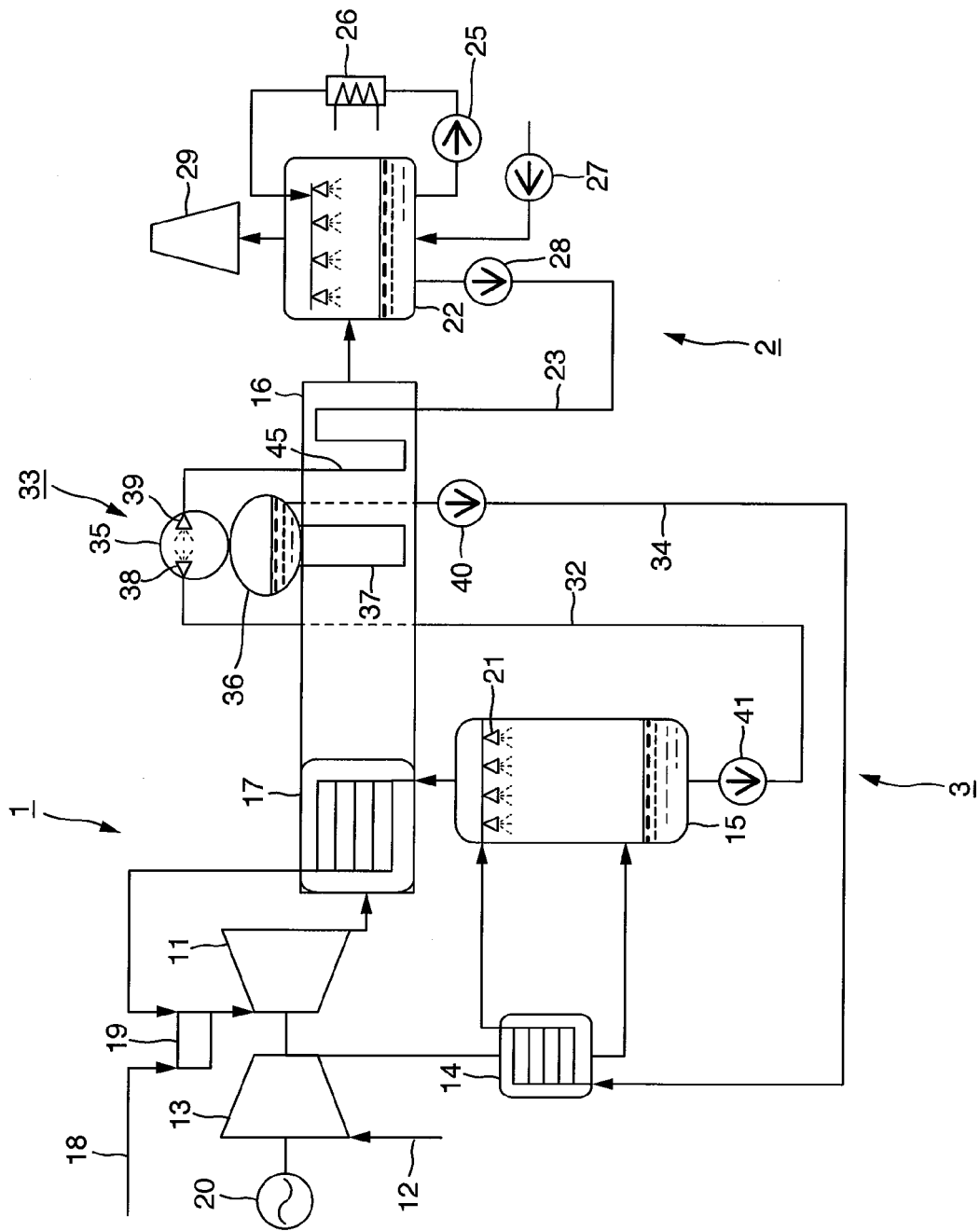
FIG. 1 is a schematic view showing a high humidity gas turbine equipment according to a first embodiment of the invention.

FIG. 1 is a schematic view showing a high humidity gas turbine equipment according to a first embodiment of the invention. The high humidity gas turbine equipment shown in FIG. 1 mainly comprises a gas turbine section 1, a makeup water system 2, and a feed water system 3.

The gas turbine section 1 includes a turbine 11 driven by combustion gas, a compressor 13, which compresses air introduced from an intake duct 12, air cooler 14, which cools air (compressed air) compressed by the compressor 13, a humidifier 15, which brings a compressed air from the air cooler 14 into direct contact with feed water to humidify the same, a regenerative heat exchanger 17, which causes a compressed air humidified by the humidifier 15 to be heated by exhaust gas, which flow in an exhaust gas duct 16, from the turbine 11, a combustor 19, by which air heated by the regenerative heat exchanger 17 and fuel introduced from fuel pipe 18 are mixed together to burn to drive the turbine 11, and a generator 20 driven by the turbine 11 to generate electricity.

The humidifier 15 includes a nozzle 21 provided in an upper portion of an interior thereof, and a filling (not shown) provided below the nozzle 21. Hot water (feed water) having made heat exchange with a compressed air in the air cooler 14 to be heated is sprayed from the nozzle 21 and the water sprayed from the nozzle 21 flows down on surfaces of the filling. In this manner, the water flowing on the surfaces of the filling comes into contact with a compressed air introduced into the humidifier 15 to humidify the compressed air. When the compressed air is humidified, surplus water falls from the filling to be stored in a lower portion (water storage portion) in the humidifier 15. In this manner, the water stored in the humidifier 15 is deaerated by the feed water system 3 and then made use of for humidification of a compressed air again.

The makeup water system 2 serves to recover water from exhaust gas in the gas turbine section 1 to supply the same to the feed water system 3. The makeup water system 2 includes a water recovery equipment 22, which condenses a moisture content in exhaust gas to recover the same, and a makeup water supply pipe 23, through which recoverd water obtained in the water recovery equipment 22 is supplied to a deaerating equipment 33 (described later).

The water recovery equipment 22 includes a circulating pump 25 for circulation of water sprayed in the equipment 22, a cooling equipment 26 for cooling water from the circulating pump 25, and a feed water pump 27, which supplies an external water appropriately when an amount of water in the equipment 22 is short.

The makeup water supply pipe 23 is a pipe extending from a lower portion of the water recovery equipment 22 to be connected to the deaerating equipment 33 (described later) of the feed water system 3. The makeup water supply pipe 23 includes a condensate pump 28, which feeds recovered water in the water recovery equipment 22 to the deaerating equipment 33, and a makeup water heater 45 for heating of makeup water with exhaust gas. The makeup water heater 45 is a section of the makeup water supply pipe 23 received in the exhaust gas duct 16. Makeup water is heated by exhaust gas in the turbine 11 when passing through the makeup water heater 45. In this manner, when makeup water is heated by exhaust gas, the water gets near to a saturated state, so that it is possible to heighten the deaerating efficiency in the deaerating equipment 33.

In the water recovery equipment 22, water stored in a lower portion of the equipment 22 is drawn by the circulating pump 25 and then cooled by the cooling equipment 26 to be sprayed onto exhaust gas from an upper portion in the water recovery equipment 22. A moisture content contained in exhaust gas is condensed by the sprayed water (cooling water) to drop as a condensed water to be again stored in the lower portion of the equipment 22. Water recovered from the exhaust gas is supplied to the deaerating equipment 33 of the feed water system 3 through the makeup water supply pipe 23 by the condensate pump 28. Also, those exhaust gas, from which a moisture content is recovered by the water recovery equipment 22, are discharged to the atmosphere through a funnel 29 provided downstream in an exhaust gas flowing direction. In this manner, the provision of the water recovery equipment 22 makes it possible to recover a moisture content contained in exhaust gas to make use of the same as makeup water for the humidifier 15, so that it is possible to decrease an amount of water used in the gas turbine section 1.

The feed water system 3 serves to circulate feed water made use of for humidification of a compressed air in the humidifier 15. The feed water system 3 includes a feed water discharge pipe 32, through which feed water stored in the humidifier 15 is discharged, the deaerating equipment 33 for deaeration of feed water from the feed water discharge pipe 32, and a feed water supply pipe 34, through which the deaerated water is supplied to the humidifier.

The feed water discharge pipe 32 is a pipe extending from a lower portion of the humidifier 15 to be connected to a deaerating section 35 (described later) of the deaerating equipment 33. The feed water discharge pipe 32 is formed with a discharge pump 41. The discharge pump 41 serves to feed water stored in the humidifier 15 toward the deaerating section 35.

The deaerating equipment 33 includes the deaerating section 35 for simultaneous deaeration of feed water and makeup water with steam, a water storage tank 36, in which feed water deaerated in the deaerating section 35 and makeup water are stored, and a steam generating section 37, which generates steam for deaeration in the deaerating section 35.

Connected to the deaerating section 35 are the feed water discharge pipe 32 and the makeup water supply pipe 23. A spray nozzle 38 is provided at that end of the feed water discharge pipe 32, which is situated in the deaerating section 35, and a spray nozzle 39 is provided at that end of the makeup water supply pipe 23, which is situated in the deaerating section 35. Feed water from the spray nozzle 38 and makeup water from the spray nozzle 39 are sprayed into the deaerating section 35. Thereby, the feed water and the makeup water are brought into direct contact with steam in the deaerating section 35. In addition, a tray, onto which the water sprayed from the spray nozzles 38, 39 flows down, may be provided in the deaerating section 35. When the tray is provided in this manner, the water sprayed from the spray nozzles 38, 39 is deaerated while flowing down onto the tray, so that it is possible to achieve an improvement in deaerating efficiency.

The water storage tank 36 is provided below the deaerating section 35 to be communicated with the deaerating section 35. The feed water and the makeup water, from which oxygen gas or carbon dioxide gas are removed, are stored in the water storage tank 36.

The steam generating section 37 comprises a pipe received in the exhaust gas duct 16 and having its end connected to a lower portion of the water storage tank 36. The steam generating section 37 makes use of exhaust gas from the turbine 11 to evaporate water introduced from the water storage tank 36 and supplies the steam to the deaerating section 35 through the water storage tank 36.

The feed water supply pipe 34 is a pipe extending from the lower portion of the water storage tank 36 to be connected to the humidifier 15. The feed water supply pipe 34 is formed with a feed water pump 40 and the air cooler 14 in order toward the humidifier 15 from the water storage tank 36. The feed water pump 40 serves to feed water in the water storage tank 36 toward the humidifier 15. The air cooler 14 comprises a heat exchanger for heat exchange between compressed air from the compressor 13 and feed water of the humidifier 15 and the feed water supply pipe 34 is arranged therein.

Subsequently, an explanation will be given to an operation of the high humidity gas turbine equipment according to the embodiment.

In the high humidity gas turbine equipment constructed in the manner described above, air introduced from the intake duct 12 is compressed by the compressor 13 and cooled by the air cooler 14. The compressed air cooled by the air cooler 14 is introduced into the humidifier 15 to be humidified and then heated by the regenerative heat exchanger 17. The compressed air heated by the regenerative heat exchanger 17 is caused to burn together with fuel in the combustor 19 to make combustion gas to rotate the turbine 11. In this manner, when the compressed air humidified by the humidifier 15 is caused to burn, combustion gas are increased in flow rate and in specific heat capacity, so that it is possible to increase a turbine output as compared with the case where a compressed air is not humidified. Exhaust gas having rotated the turbine 11 heat compressed air in the regenerative heat exchanger 17, water in the steam generating section 37, and makeup water in the makeup water supply pipe 23 when passing through the exhaust gas duct 16 and are led to the water recovery equipment 22.

Exhaust gas led to the water recovery equipment 22 are cooled by cold water sprayed from above. Thereby, a moisture content contained in the exhaust gas is condensed to drop and stored in the water recovery equipment 22. Water recovered from the exhaust gas in the water recovery equipment 22 is fed to the deaerating section 35 of the deaerating equipment 33 through the makeup water supply pipe 23 after being heated by exhaust gas of the turbine 11 in the makeup water heater 45. Water left over when compressed air is humidified by the humidifier 15 is further led to the deaerating section 35 of the deaerating equipment 33 through the feed water discharge pipe 32.

In the deaerating equipment 33, feed water from the feed water discharge pipe 32 is sprayed through the spray nozzle 38 into the deaerating section 35 and makeup water from the makeup water supply pipe 23 is sprayed through the spray nozzle 39 into the deaerating section 35. Thereby, the feed water and the makeup water can be simultaneously deaerated in the deaerating section 35. Also, since the feed water and the makeup water are sprayed from the spray nozzles 38, 39 to be spread in the deaerating section 35, they are agitated for a long period of time in a state, in which their contact areas with steam are large. Accordingly, heat exchange of the feed water and the makeup water with steam in the deaerating section 35 is promoted, so that an efficient deaeration can be achieved.

Both the feed water and the makeup water as deaerated are once stored in the water storage tank 36 and supplied to the humidifier 15 after passing through the feed water supply pipe 34 to be heated by the air cooler 14.

Subsequently, an explanation will be given to an effect of the embodiment with reference to a comparative example.

In general, high humidity gas turbine equipment, water (feed water) left over when compressed air is humidified by a humidifier is caused to circulate through a feed water system in a state of containing oxygen gas. Therefore, there is a need of using a high corrosion-resisting material (for example, stainless steel) for elements and pipes, etc., which constitute a feed water system, and so there is a tendency of an increase in construction cost. There is a technology for an improvement in this respect, in which feed water is decreased in dissolved oxygen concentration by providing a vacuum deaerating equipment to reduce the feed water in pressure to create a saturated state (see JP-A-9-264158).

By the way, since feed water is decreased according to an amount used for humidification of compressed air in a humidifier of a high humidity gas turbine equipment, it is necessary to appropriately supply makeup water. Accordingly, it is demanded to make use of that makeup water, which does not contain oxygen, from the view point of protecting a feed water system against corrosion. However, the comparative example makes no reference to means for deaeration of makeup water, and so it is necessary to make use of pure water as makeup water in order to form a feed water system from a material having a low corrosion-resistance property. Also, it can be pointed out that in a vacuum deaerating equipment as in the comparative example, only reduction in pressure of feed water results in an unfavorable deaerating efficiency because of a limited gas-liquid contact area.

In contrast thereto, the high humidity gas turbine equipment according to the embodiment of the invention supplies feed water used for humidification of air in the humidifier 15 and makeup water for the humidifier 15 through the spray nozzles 38, 39 and includes the deaerating section 35 for deaeration of the feed water and the makeup water with steam, the water storage tank 36, in which the feed water deaerated in the deaerating section 35 and the makeup water are stored, and the deaerating equipment 33 having the steam generating section 37, which makes use of exhaust gas from the turbine 11 to evaporate the feed water and the makeup water in the water storage tank 36 to supply the steam to the deaerating section 35.

With the high humidity gas turbine equipment constructed in the manner described above, it is possible to perform deaeration of the makeup water together with deaeration of the feed water since the feed water and the makeup water are simultaneously supplied to the deaerating section 35. Thereby, even in case of making use of water containing oxygen as makeup water, a gas turbine equipment can be reduced in construction cost since elements and pipes, etc. (for example, the feed water supply pipe 34, the air cooler 14, etc.), through which makeup water passes from the water storage tank 36 to the humidifier 15, can be formed by a material of low corrosion-resistance property. Also, because of being sprayed through the spray nozzles 38, 39 to be spread in the deaerating section 35, the feed water and the makeup water in the present embodiment are agitated for a long period of time in a state, in which their contact areas with steam are large. Thereby, since heat exchange of the feed water and the makeup water with steam in the deaerating section 35 is promoted, so that an efficient deaeration can be achieved as compared with the case where feed water is reduced in pressure to be put a saturated state as in the comparative example. As described above, with the high humidity gas turbine equipment according to the embodiment, it is possible to efficiently deaerate the feed water used for humidification of the compressed air and the makeup water at the same time.

In addition, an explanation has been given taking a gas turbine equipment provided with the water recovery equipment 22, which recovers a moisture content contained in exhaust gas, as an example, the invention is applicable to a gas turbine equipment constructed to be supplied with makeup water from outside. In this case, it suffices to supply makeup water directly to the deaerating section 35 through, for example, the makeup water supply pipe 23.

By the way, it is necessary in the comparative example to supply pure water to a feed water system in order to make use of a material having a low corrosion-resistance property for a pipe, through which feed water after deaeration passes up to a humidifier. According to the embodiment, however, deaeration can be performed in the deaerating section even when oxygen is contained in makeup water. Thereby, since there is no need of preparing pure water, it is possible to reduce a gas turbine equipment in construction cost and operation cost. In particular, in the case where a moisture content, which a water recovery equipment or the like cools exhaust gas to recover, is made use of as makeup water in a conventional, high humidity gas turbine equipment, it is necessary to form a feed water system from a high corrosion-resistance material since oxygen is necessarily contained in the recovered makeup water. When the deaerating equipment 33, in which feed water and makeup water can be simultaneously deaerated, is provided as in the embodiment to be connected to the water recovery equipment 22, however, it is possible to use the deaerating section 35 to deaerate oxygen in the makeup water recovered from exhaust gas, so that it is possible to decrease an amount of water used in the gas turbine section 1 as well as to form parts, which extend from the water storage tank 36 to the humidifier 15, from a material having a low corrosion-resistance property.

Also, for the sake of an improvement in power generating efficiency, it is frequent in a general, high humidity gas turbine equipment including the comparative example to provide a heater for feed water on a downstream side of a regenerative heat exchanger in an exhaust gas duct. In contrast thereto, according to the embodiment, the steam generating section 37 of the deaerating equipment 33 makes use of exhaust gas to generate steam for deaeration and to heat feed water to be supplied to the humidifier 15. Thereby, since it is possible to heat feed water without providing a separate heater as in the comparative example, it is possible to achieve a decrease in construction cost while maintaining the power generating efficiency.

In addition, while the embodiment has been described taking, as an example, the case where feed water as deaerated is heated in the air cooler 14 and then supplied to the humidifier 15 in order to achieve an improvement in power generating efficiency, the feed water supply pipe 34 may be connected directly to the humidifier 15 from the water storage tank 36 without the provision of the air cooler 14. Also, the case where the makeup water heater 45 heats makeup water with exhaust gas in order to achieve an improvement in power generating efficiency and deaerating efficiency has been described as an example, but the makeup water supply pipe 23 may be connected directly to the deaerating equipment 33 without passing through an interior of the exhaust gas duct 16.

By the way, a new effect in addition to the effect described above can be produced by modifying a part of the construction of the first embodiment. This embodiment will be described below as a second embodiment of the invention.

Figure 2:
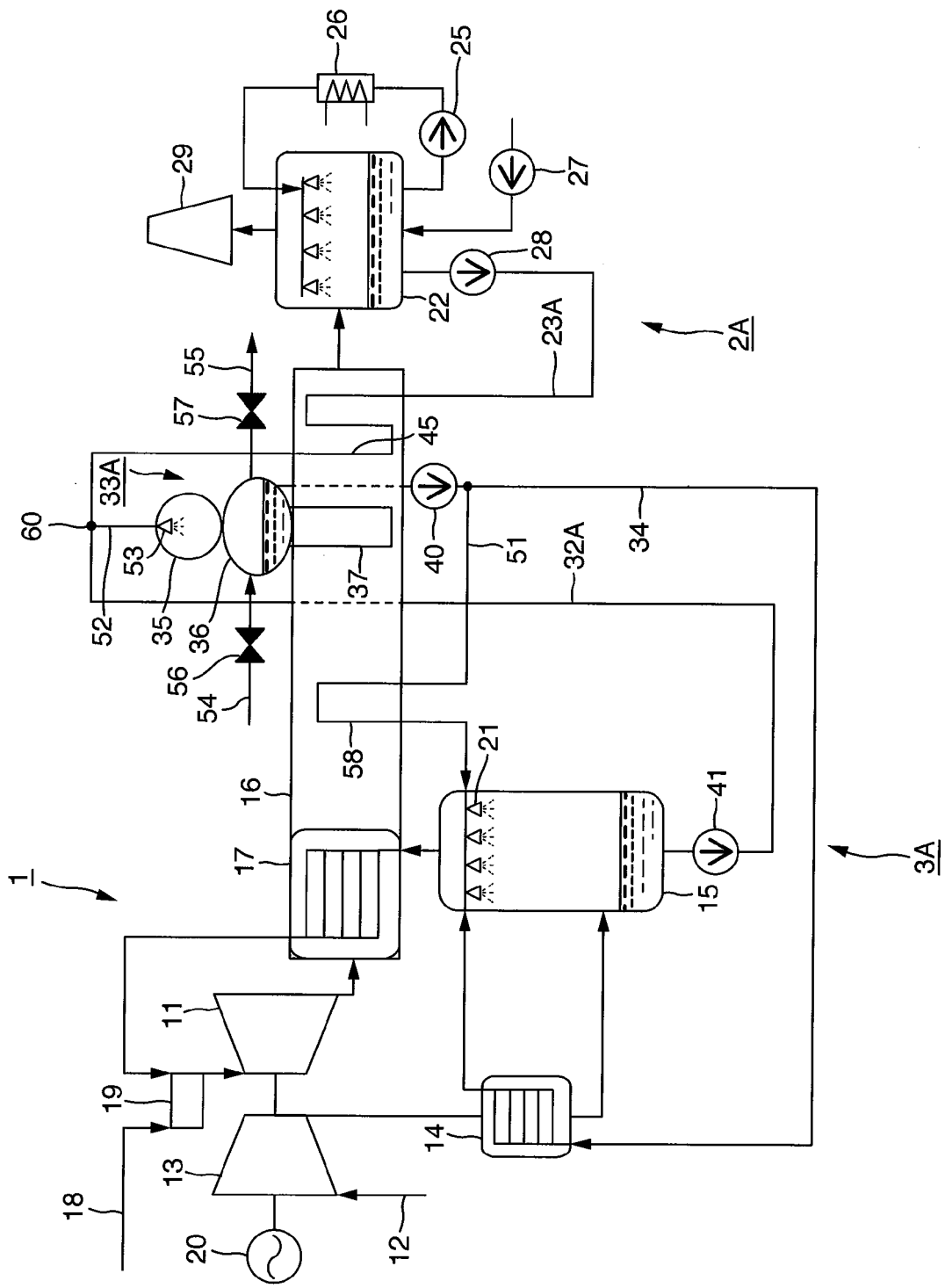
FIG. 2 is a schematic view showing a high humidity gas turbine equipment according to a second embodiment of the invention.

FIG. 2 is a schematic view showing a high humidity gas turbine equipment according to the second embodiment of the invention. In addition, the same parts as those in the first embodiment are denoted by the same reference numerals and an explanation therefor is omitted.

The high humidity gas turbine equipment shown in FIG. 2 mainly comprises a gas turbine section 1, a makeup water system 2A, and a feed water system 3A.

The makeup water system 2A is different from that of the first embodiment in that a makeup water supply pipe 23A is provided. The makeup water supply pipe 23A is connected to a feed water discharge pipe 32A at a point 60 of connection positioned upstream of a deaerating equipment 33A (described later). That is, feed water and makeup water being supplied to a deaerating section 35 join together at the point 60 of connection.

The feed water system 3A is different from that of the first embodiment in including the feed water discharge pipe 32A, a feed water supply pipe 51, a flow joining pipe 52, and the deaerating equipment 33A.

The feed water discharge pipe 32A is connected to the makeup water supply pipe 23A at the point 60 of connection. The flow joining pipe 52 is a pipe, which extends from the point 60 of connection to be connected to the deaerating equipment 33A and in which feed water and makeup water having joined together at the point 60 of connection flows toward the deaerating section 35 on a downstream side. In this manner, when the flow joining pipe 52 is provided, feed water and makeup water are mixed in the flow joining pipe 52 even in the case where a temperature deviation between the feed water and the makeup water is present on an upstream side of the point 60 of connection, so that the temperature deviation is dissolved.

The feed water supply pipe 51 is a pipe including a feed water heating section 58 provided in an exhaust gas duct 16 to heat feed water circulating therein and connecting between a feed water supply pipe 34 and a humidifier 15. The feed water heating section 58 is a portion of the feed water supply pipe 51 received in the exhaust gas duct 16. Feed water flowing through the feed water supply pipe 51 is heated by exhaust gas of a turbine 11 when flowing through the feed water heating section 58 and supplied to the humidifier 15. When the feed water supply pipe 51 having the feed water heating section 58 is provided in this manner, the quantity of heat recovered from the exhaust gas of the turbine 11 increases, so that it is possible to achieve an improvement in power generating efficiency. In addition, the feed water heating section 58 in this embodiment is provided in the exhaust gas duct 16 to heat feed water but a heat exchanger for heat exchange between exhaust gas and feed water may be provided instead. Also, the feed water supply pipe 51 is a pipe branched from the feed water supply pipe 34 in this embodiment but may be a pipe for direct connection between a water storage tank 36 and the humidifier 15 to be made independent from the feed water supply pipe 34. In this case, however, it is required that a pump similar to the feed water pump 40 be provided on the feed water supply pipe 51.

The deaerating equipment 33A is different from that of the first embodiment in including a spray nozzle 53, a steam introducing pipe 54, and a steam supply pipe 55.

The spray nozzle 53 is mounted to an end of the flow joining pipe 52 and provided to face an interior of a deaerating section 35. Feed water and makeup water, which have been mixed in the flow joining pipe 52, are sprayed into the deaerating section 35 from the spray nozzle 53. By the way, since feed water and makeup water are sprayed from the separate spray nozzles 38, 39 in the first embodiment, a decrease in deaerating efficiency is brought about in some cases when there is a deviation between the respective temperatures thereof. In contrast, according to the second embodiment, feed water and makeup water, which are joined in the flow joining pipe 52 upstream of the deaerating section 35, are sprayed through the spray nozzle 53. When feed water and makeup water are joined upstream of the deaerating section 35 in this manner, a temperature deviation can be dissolved when it is present between them prior to being joined. Accordingly, the second embodiment can improve the deaerating equipment 33A in deaerating efficiency as compared with the first embodiment. In addition, feed water and makeup water in this embodiment are joined by connecting the feed water discharge pipe 32A and the makeup water supply pipe 23A to each other at the point 60 of connection but they may be joined by connecting a downstream end of the makeup water supply pipe 23A to a water storage portion (lower portion) of the humidifier 15. Also in case of such construction, it goes without saying that the spray nozzle 53 may be provided in a location, in which the joined water is introduced into the deaerating section 35.

The steam introducing pipe 54 permits steam from an external steam generating equipment to be introduced therethrough into the deaerating section 35 and is mounted to the deaerating equipment 33A. An upstream end of the steam introducing pipe 54 is connected to an external steam generating equipment. The external steam generating equipment includes, for example, a deaerator of a high humidity gas turbine equipment constructed in the same manner as that in the present embodiments. With a construction, in which steam from an external steam generating equipment can be introduced in this manner, feed water and makeup water can be deaerated by replenishing steam from outside even in the case where exhaust gas are low in temperature and so the quantity of steam required for deaeration in the steam generating section 37 cannot be ensured (for example, at the starting of a gas turbine equipment, or the like). In addition, a flow control valve 56 is preferably provided on the steam introducing pipe 54 to regulate the quantity of steam as introduced according to the situation.

The steam supply pipe 55 permits steam generated in the steam generating section 37 to be supplied to an external steam utilizing equipment and is mounted to the deaerating equipment 33A. A downstream end of the steam supply pipe 55 is connected to the external steam utilizing equipment. The external steam utilizing equipment includes, for example, a deaerator of a high humidity gas turbine equipment constructed in the same manner as that in the present embodiments. With a construction, in which steam can be supplied to the external steam utilizing equipment in this manner, steam as excessively generated is made effective use of, so that it is possible to achieve an improvement in thermal efficiency. For example, by forming the steam supply pipe 55 so as to enable supplying steam to a deaerator of a further high humidity gas turbine equipment, it is possible to replenish steam even in the case where the quantity of steam required for deaeration in the deaerator of the further high humidity gas turbine equipment cannot be ensured. In addition, a flow control valve 57 is preferably provided on the steam supply pipe 55 to regulate the quantity of steam as supplied according to the situation.

In addition, an intake air humidifier (not shown) may be provided on the intake duct 12 of the high humidity gas turbine equipment according to the respective embodiments described above. The provision of such intake air humidifier makes it possible to reduce a load on the compressor 13, thus enabling an improvement in power generating efficiency.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A high humidity gas turbine equipment comprising:
   a turbine driven by combustion gas;
   a compressor, which compresses air;
   a humidifier, which brings the air compressed by the compressor into contact with feed water to humidify the air;
   a regenerative heat exchanger, which causes the air humidified by the humidifier to be heated by exhaust gas from the turbine;
   a combustor, which burns the air heated by the regenerative heat exchanger and fuel to generate the combustion gas, which drives the turbine;
   a deaerating equipment including a deaerating section, to which the feed water used in the humidifier for humidification of air and makeup water, comprising water recovered from the exhaust gas and external water to the humidifier, are supplied and which deaerates the feed water and the makeup water with steam, a water storage tank, in which the feed water deaerated in the deaerating section and the makeup water are stored, and a steam generating section, which causes the feed water and the makeup water in the water storage tank to be heated by the exhaust gas from the turbine to evaporate and supplies the steam to the deaerating section; and
   a feed water supply pipe, through which the feed water and the makeup water in the water storage tank are supplied to the humidifier.

2. The high humidity gas turbine equipment according to claim 1, wherein feed water and makeup water, which are supplied to the deaerating section, are joined upstream of the deaerating section.

3. The high humidity gas turbine equipment according to claim 1, wherein the deaerating section includes a steam introducing pipe, through which steam from an external steam generating equipment is introduced into the deaerating section.

4. The high humidity gas turbine equipment according to claim 1, wherein the deaerating section includes a steam supply pipe, through which steam generated in the steam generating section is supplied to an external steam generating equipment.

5. The high humidity gas turbine equipment according to claim 1, further comprising:
   a water recovery equipment, which cools exhaust gas from the gas turbine to condense moisture content in the exhaust gas to recover the same; and
   a makeup water supply pipe, through which recovered water obtained in the water recovery equipment is supplied as makeup water for the humidifier to the deaerating equipment.

6. The high humidity gas turbine equipment according to claim 1, wherein the feed water supply pipe includes feed water heating means provided in a flow passage of exhaust gas from the gas turbine to heat feed water flowing therein.

7. The high humidity gas turbine equipment according to claim 1, further comprising:
   an air cooler for heat exchange between the air compressed by the compressor and the feed water in the feed water supply pipe.

8. A high humidity gas turbine equipment comprising:
   a turbine driven by combustion gas;
   a compressor, which compresses air;
   a humidifier, which brings the air compressed by the compressor into contact with the feed water to humidify the air;
   a regenerative heat exchanger, which causes the air humidified by the humidifier to be heated by exhaust gas from the turbine;
   a combustor, which burns the air heated by the regenerative heat exchanger and fuel to generate the combustion gas, which drive the turbine;
   a water recovery equipment, which cools the exhaust gas from the gas turbine to condense moisture content in the exhaust gas to recover water;
   a deaerating equipment including a deaerating section, to which the feed water used in the humidifier for humidification of the air and makeup water, comprising water obtained in the water recovery equipment and water externally supplied to the high humidity gas turbine equipment, are supplied and which deaerates the feed water and the makeup water with steam, a water storage tank, in which the feed water deaerated in the deaerating section and the makeup water are stored, and a steam generating section, which causes the feed water and the makeup water in the water storage tank to be heated by the exhaust gas from the turbine to evaporate and supplies the steam to the deaerating section; and
   a feed water supply pipe, through which the feed water and the makeup water in the water storage tank are supplied to the humidifier.

* * * * *